Aug. 25, 1964 R. A. WOLFF 3,146,311

F.M. STEREO INDICATOR

Filed May 14, 1962

INVENTOR.
Robert A. Wolff
BY James T. Barr
ATTY.

United States Patent Office 3,146,311
Patented Aug. 25, 1964

3,146,311
F.M. STEREO INDICATOR

Robert A. Wolff, La Grange Park, Ill., assignor to Admiral Corporation, Chicago, Ill., a corporation of Delaware Filed May 14, 1962, Ser. No. 194,405
1 Claim. (Cl. 179—15)

Figure 1:
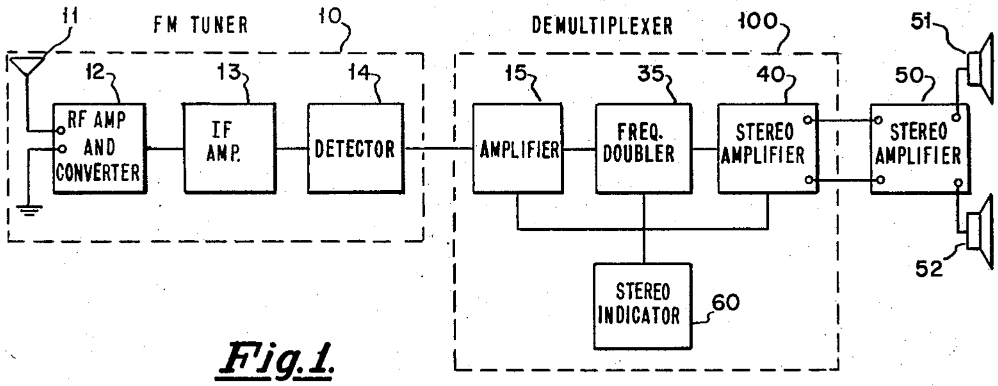

This invention relates in general to frequency modulation stereo demultiplexing equipment and in particular to means in such equipment for readily indicating when a frequency modulation stereo signal is being received.

Recently the Federal Communications Commission adopted certain standards for FM stereo broadcasting. According to these standards, the composite stereo signal transmitted by the station comprises a left channel plus right channel ($L+R$) audio summation signal, a left channel minus right channel ($L-R$) amplitude modulation audio difference signal and a pilot signal. Assuming for the moment that a non-recorded musical program was to be broadcast, a left channel microphone (or combination of microphones) and a right channel microphone (or combination of microphones) would be placed in appropriate positions before the orchestra. The $L+R$ signal is obtained by adding the output signals of the L and R microphones and the $L-R$ signal by subtracting these output signals.

The $L-R$ signal then amplitude modulates a 38 kilocycle per second carrier wave which is thereafter suppressed, leaving only the sideband information. While the term "carrier wave" is applied in this description to the 38 kilocycle per second signal, it should be realized that it is in fact a subcarrier with respect to the main station carrier wave. To allow the 38 kc. carrier to be reproduced or regenerated in the receiving equipment, a pilot signal, of accurately controlled phase and frequency, is also developed. The $L+R$ audio information, the $L-R$ sideband information and the pilot signal are then combined and this combined signal is used as the modulating signal for frequency modulating the high frequency broadcast carrier of the transmitting station. According to the FCC standards, the frequency of the pilot signal must be one-half the frequency of the 38 kc. subcarrier, or 19 kc., and have a predetermined amplitude.

Various literature in the art has shown that the composite stereo signal may be constructed in different manners. One such technique involves time division multiplex in which the left and the right channel information is alternately sampled at a 38 kilocycle per second sampling rate.

Similarly, there are numerous methods for decoding or demultiplexing the composite stereo signal to obtain separate left and right channel signals in the receiving equipment. The circuit to be described illustrates one such method, which will be termed envelope detection. This method may be understood most readily by viewing it as the converse of the time division multiplex technique.

The envelope detection method utilizes the fact that the composite stereo signal, after detection in conventional FM receiving equipment, comprises a pure L signal which is interleaved with a pure R signal. The respective R and L envelopes are defined by alternate sets of peaks of the 38 kc. carrier, which may be considered as the sampling wave in the time division multiplex system. By appropriate reinsertion of the 38 kc. carrier, the L signal envelope and the R signal envelope may be instantaneously separated from each other and individually detected by simple diode rectifier networks. This system eliminates the need for separate detection of the $L+R$ and $L-R$ signals and the matrix circuitry required to obtained the pure R signal and the pure L signal.

One of the incidental problems of compatible monaural-stereophonic FM broadcasting is that posed to the listener in determining whether a monaural or stereophonic program is being received. This determination is difficult where the stereophonic program material does not exhibit a great deal of difference between the left and right channel information. This is especially true in the case of classical music in which protracted and attentive listening may be required to perceive the small difference between the left channel output and the right channel output. Even with program material having a great degree of stereophonic effect, it is usually necessary for the listener to step back and listen for a certain amount of time to ascertain whether the program material is monaural or stereophonic.

The invention provides a simple means for visually indicating to the listener when an FM stereo program is being received. The visual indicating means used in the circuit to be described is a small neon bulb which is lighted responsive to the presence of the 19 kc. pilot.

Accordingly, a principal object of this invention is to provide novel means for operating a gaseous type indicating device.

A further object of this invention is to provide a gaseous type discharge device which is driven conductive responsive to conduction in a relatively low voltage transistor.

Another object of this invention is to provide a novel indicating means for determining the presense of an FM stereophonic broadcast.

A still further object of this invention is to provide a wholly transistorized FM demultiplexing unit with a gaseous type indicating device for indicating the presence of the sterophonic pilot signal.

Still another object of this invention is to provide in a transistorized stereophonic demultiplexing unit an economical indicating light for determining the presence of stereophonic broadcasts.

Figure 2:
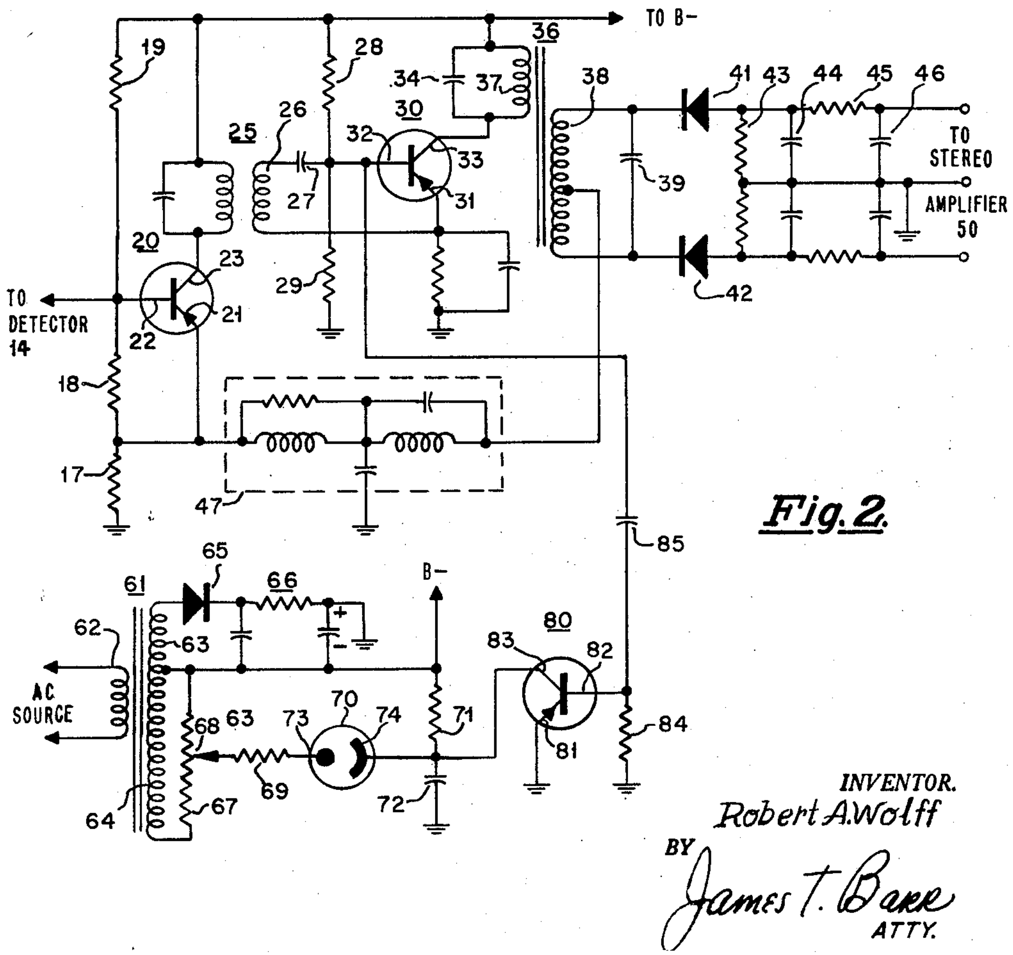

Further objects and advantages of this invention will be apparent upon reading the following specification in conjunction with the drawing in which FIG. 1 depicts in block form a receiving system capable of receiving and decoding an FM stereo signal and FIG. 2 represents a schematic diagram of the demultiplexer unit of FIG. 1.

Referring now to FIG. 1, a block diagram of an FM tuner is shown in dashed line box 10. An antenna 11 couples a received broadcast signal from an FM transmitting station to radio frequency amplifier and converter 12 where, in a well known manner, the selected station carrier is heterodyned with a locally generated signal to produce an intermediate frequency signal. The resultant signal is amplified by intermediate frequency amplifier 13 and detected by detector 14. The FM tuner is in all respects conventional and, responsive to receipt of a monaural transmission, the output of detector 14 produces an audio frequency monaural signal. Responsive to receipt of an FM stereophonic signal, the output of detector 14 produces an audio summation signal, sidebands of an audio difference signal and a pilot signal.

A block diagram of a demultiplexer unit is shown in dashed line box 100. The output of detector 14 is coupled to an amplifier 15 which includes circuitry for separating the pilot signal. The pilot signal is coupled to a frequency doubler 35 which reproduces the original 38 kc. subcarrier. Both amplifier 15 and doubler 35 feed stereo detector 40 in which the regenerated 38 kc. wave is combined with the audio $L+R$ signal and the sidebands of the $L-R$ signal. Stereo detector 40 has two outputs, one of which develops a pure R signal and the other of which develops a pure L signal. These signals are coupled to stereo amplifier 50 where they are amplified in a well known manner and drive a pair of stereo speakers 51 and 52 to reproduce the R and L signals in acoustical form. Frequency doubler 35 is also coupled to a stereo indicator 60 which yields a visual indication of the presence of the 19 kc. pilot.

In FIG. 2 the circuitry included in demultiplexer 100 is shown in detail. A transistor 20 having an emitter 21, a base 22 and a collector 23 is arranged as an amplifier for the composite stereo signal from detector 14. Collector 23 has a tuned load circuit 25 which is tuned to the frequency of the pilot in the composite stereo signal. Serially connected resistors 17, 18, and 19 are connected between B— and ground and provide proper bias for transistor 20. Since tuned circuit 25 is tuned to the frequency of the pilot, the audio summation and the sideband information signals do not develop appreciable voltages therein. With respect to these latter signals, transistor 20 acts as an emiter follower and the audio summation signal and the sideband information signal appear across resistor 17.

Winding 26 is coupled to tuned circuit 25 and impresses a voltage, through a capacitor 27, between the emitter 31 and base 32 of transistor 30. Resistors 28 and 29 bias transistor 30 so that it is operating on the nonlinear portion of its operating characteristic. Consequently, the 19 kc. pilot signal generates numerous harmonics in the collector load circuit of transistor 30. Collector 33 is connected, through the parallel combination of a capacitor 34 and the primary winding 37 of a transformer 36, to a source of B— potential. Winding 37 and capacitor 34 are tuned to 38 kc. and select the second harmonic of the pilot frequency.

Transformer 36 has a center tapped secondary winding 38 with a capacitor 39 coupled thereacross. Secondary winding 38 and capacitor 39 are tuned to 38 kc. The center tap of winding 38 is connected through a filter and sideband peaking network 47 to emitter 21 of transistor 20. The filter traps out any FCC subsidiary carrier authorization (SCA) transmissions to prevent interference therefrom. Thus, the secondary 38 of transformer 36 has three signals applied to it, the first being the developed 38 kc. carrier wave, the second being the audio summation component $(L+R)$ and the third being the audio difference sideband information $(L-R)$. It should also be noted that the 19 kc. pilot may also be trapped in the filter and peaking network 47, if desired.

A pair of diodes 41 and 42 and their respective load circuits are individually coupled to opposite ends of winding 38. The load for diode 41 comprises resistor 43 and bypass capacitor 44. The reintroduced 38 kc. carrier wave may be considered as a switch for alternately turning on diodes 41 and 42. Another way of looking at the operation of this circuit is that the pure R signal envelope is separated from the pure L signal envelope by the intrdouction of the 38 kc. carrier wave and these envelopes are separately detected by diodes 41 and 42. Thus a pure R signal, for example, is developed across load resistor 43 and appears at the input of stereo amplifier 50 and a pure L signal is developed across the load resistor of diode 42 and appears at the corresponding input to stereo amplifier 50. Resistor 45 and capacitor 46 provide deemphasis to the detected signal in a well known manner.

The power supply for demultiplexer 100 comprises a transformer 61 having a primary winding 62 connected to a source of A.C. potential and a secondary winding including a portion 63 and a portion 64. Portion 63 is coupled to a diode 65 and an appropriate filter network 66 which develops a B— potential as indicated. Portion 64 has a resistor 67 connected thereacross and a movable tap 68 which is movable over resistor 67. A gaseous discharge device 70, which may be a neon bulb, has terminal 73 connected to tap 68 through a resistor 69 and terminal 74 connected to B— through a resistor 71. A bypass capacitor 72 for the pilot frequency is connected between ground and terminal 74.

An additional transistor 80 having an emitter 81, a base 82, and a collector 83 is connected as a switch for controlling operation of gaseous discharge device 70. Base 83 of transistor 80 is coupled through a capacitor 85 to base 32 of transistor 30, which it will be recalled, has the pilot signal applied to it. Resistor 84, connected between base 82 and ground, develops self-bias for transistor 80. Collector 83 is connected to the junction of capacitor 72 and resistor 71, and it will be noted that resistor 71 thus comprises the load resistance for transistor 80.

When it is considered that the B— potential for the transistorized demultiplexer unit is on the order of 20 volts and that the ignition potential for an ordinary neon tube is on the order of 65 volts, the problem in utilizing such an indicator in this type of circuit is readily realized. The alternating current potential across winding portion 64 is applied across the two terminals of discharge device 70. This potential is variable depending upon the position of tap 68 on resistor 67. Both terminals of discharge device 70 are also connected to B— and hence, no net D.C. potential appears thereacross assuming transistor 80 is not conducting.

Upon reception of a stereophonic FM signal, the pilot appears at base 32 of transistor 30. This pilot signal is coupled to base 82 of transistor 80 and drives transistor 80 conductive along its emitter-collector path. Upon conduction in transistor 80, load current flows through resistor 71 and a potential difference is developed thereacross. The current flow through resistor 71 upsets the D.C. voltage balance across terminals 73–74 of the discharge device and the net effect is that the B— potential adds to the A.C. potential during negative half-cycles and subtracts from the A.C. potential during positive half cycles. The added voltages exceed the ignition potential of discharge device 70 and conduction occurs. The subtracted voltages fall further below the potential required to maintain conduction and discharge device 70 ceases conducting current. As long as transistor 80 is in conduction, the gaseous discharge device 70 is driven conductive and nonconductive at the frequency of the A.C. potential.

It is necessary to be able to vary the A.C. potential across discharge device 70 to accommodate the range of striking or ignition potentials encountered in gaseous discharge devices such as neon tubes. When installing the demultiplexer unit, the FM tuner is tuned to a station known to be broadcasting in sterophonic sound and movable tap 68 is adjusted until discharge device 70 is just driven conductive. Thereafter, removal of the pilot signal (on a monaural broadcast) renders transistor 80 nonconductive and terminals 73–74 of discharge device 70 are at the same direct current potential. The disappearance of the direct current potential difference across discharge device 70 results in cessation of current flow therein.

It should be apparent that the trigger voltage for transistor 80 may be selected from the 38 K.C. portion of the doubler arrangement as well as in the manner shown. If desired a triggered oscillator circuit may also be employed to energize the indicator circuitry.

What has been described is a novel means of operating a gaseous discharge indicator tube and a novel combination of such an indicator tube used in a transistorized demultiplexer arrangement. It is understood that numerous departures may be made from the embodiments of the invention as shown without departing from its true spirit and scope as defined in the claim.

The embodiments of the invention in which an exclusive property or privilege is claimed are defined as follows:

In combination: transistorized frequency modulation radio apparatus receiving and translating monaural frequency modulation transmissions and stereophonic frequency modulation transmissions, said stereophonic transmissions including an audio summation component, an amplitude modulated audio difference component with suppressed carrier and a pilot component for regenerating said carrier; a detector in said radio apparatus producing an audio signal on monaural transmissions and producing said audio summation component, side bands of said amplitude modulated audio difference component and said pilot component on stereophonic transmissions; means coupled to said detector for separating said pilot component; generator means controlled by said separated pilot component for regenerating said carrier; detecting means combining said audio summation component, said audio difference component side bands and said carrier for producing an audio signal A and an audio signal B in which $A+B$ represents the audio summation component and $A-B$ represents the audio difference component; a normally nonconductive transistor having an input circuit coupled to said generator means; a gaseous indicating device in the load circuit of said transistor; a variable alternating current source and a direct current source, said sources having a common terminal; a load resistor coupled between said common terminal and said gaseous indicating device whereby said variable alternating current source is connected across said indicating device and both terminals of said indicating device are maintained at the same direct current potential; the direct current potential at one terminal of said indicating device being changed responsive to conduction of said transistor whereby the combined variable alternating current potential and direct current potential is applied across said indicating device, and means for varying said variable alternating current source to compensate for the firing and extinction potentials of the particular gaseous indicating device used and for varying the sensitivity thereof.

References Cited in the file of this patent

UNITED STATES PATENTS

| | | |
|---|---|---|
| 2,927,247 | Hennis | Mar. 1, 1960 |
| 2,938,196 | Beter et al. | May 24, 1960 |
| 3,009,151 | Shoaf | Nov. 14, 1961 |

OTHER REFERENCES

"FM Multiplex Autoadaptor MX99," 1961, Form MX99–961–1.

Bially: "A Filterless Method for the Detection of FM-Stereo Signals," Audio, January 1962 (pp. 35–38, and 69 relied on).